United States Patent [19]

Kordesch et al.

[11] Patent Number: 4,977,364
[45] Date of Patent: Dec. 11, 1990

[54] METHOD AND A TAPER CHARGER FOR THE RESISTANCE FREE CHARGING OF A RECHARGEABLE BATTERY

[75] Inventors: Karl Kordesch; Ronald Ujj, both of Graz, Austria

[73] Assignee: Battery Technologies Inc., Mississauga, Canada

[21] Appl. No.: 335,289

[22] Filed: Apr. 10, 1989

[30] Foreign Application Priority Data

Apr. 11, 1988 [CA] Canada ................................. 563842

[51] Int. Cl.⁵ .............................................. H02J 7/10
[52] U.S. Cl. ...................................... 320/21; 320/23; 320/39
[58] Field of Search ....................... 320/31, 21, 23, 39, 320/35

[56] References Cited

U.S. PATENT DOCUMENTS

| | | | |
|---|---|---|---|
| 3,531,706 | 9/1970 | Mullersman | 320/35 X |
| 4,131,841 | 12/1978 | Bennefeld | 320/23 |
| 4,392,101 | 7/1983 | Saar et al. | 320/39 X |
| 4,684,871 | 8/1987 | Plagge | 320/21 |
| 4,785,226 | 11/1988 | Fujisawa et al. | 320/21 |

*Primary Examiner*—R. J. Hickey
*Attorney, Agent, or Firm*—Donald E. Hewson

[57] ABSTRACT

A resistance free constant voltage taper charger for batteries in which a voltage regulator of a conventional type is combined with a conventional instrumentation amplifier in such a way that the output voltage increases by the same amount as a reference voltage coupled to the input of the amplifier is varied. The result will be that the voltage at the final output is constant.

The same basic circuit can be complemented with two switches and with a sample and hold circuit controlled by a pulse generator so that in short pulse periods the voltage regulator is disabled and the resistance free electrochemical battery voltage is samples, and during the longer intervals between the periods the sampled and stored value is used to regulate the output voltage so that the electrochemical voltage remains unchanged.

8 Claims, 5 Drawing Sheets

METHOD AND A TAPER CHARGER FOR THE RESISTANCE FREE CHARGING OF A RECHARGEABLE BATTERY

The invention relates to a method and a taper charger for the resistance free charging of a rechargeable battery.

The methods for charging batteries vary in many respects, depending on the type of batteries, their constructions and their applications. However, all methods need to detect the fully charged state. A good end-of-charge detection method exists with cathode-limited Ni-Cd and Ni-Zn cells which are charged in a constant current mode and use the end-of-charge voltage jump as indicator. Because of the characteristics of $MnO_2$ electrodes, rechargeable alkaline $MnO_2$-Zinc cells should be charged at a preset constant voltage, which results in a tapering off charge current.

This method, however, does not take advantage of the capability of the rechargeable alkaline $MnO_2$-Zn system in a low state of charge condition to be charged quickly to a high level, when desired. Taper charging starts with a certain current (limited by the internal resistances of the cell and the output of the charging equipment) and soon tapers to a lower current, determined by the rising cell potential and the preset end of charge voltage.

The tapering current type of chargers have obtained, wide acceptance also in case of batteries other than $MnO_2$-Zinc cells e.g. for charging Ni-Cd batteries, owing to the limited hazard of overcharging. It is beyond doubt that taper chargers require long charging times and cannot utilize the higher current take up capabilities of fully or partially discharged batteries due to current limitation caused by their series resistance.

U.S. Pat. No. 2,864,055 disclosed a resistance free method for determining the state of charge of batteries using periodic charging pulses and measuring the resistance free voltage in pulse intervals.

The idea of resistance free charging was treated also in the paper of K. Kordesch, J. Electrochem. Soc. 119, 1053, (1972) confirming that its application causes the cell to accept the charge fast and the tapering occurs quickly to the set voltage.

The paper could not offer, however, a cheap, readily usable circuit arrangement or method for the determination of the resistance free battery voltage and for a practical voltage regulation based thereon.

The primary object of the present invention is to provide a method for the resistance free charging of batteries, mainly of alkaline batteries without the limitations connected with prior art methods.

A further object of the invention is to provide a method for determining the state of charge of a battery of prdetermined type.

A still further object of the invention is to provide a taper charger which utilizes the resistance free charging principle and which is cheap and feasible for large scale production.

It has been recognized according to the present invention that the controlled voltage charging principle of a constant voltage charger with tapering off charging current can be combined with the reduction of the current limitation usually imposed by the internal resistance of the cell to be charged. The voltage to which the control circuit is periodically referenced to is determined by eliminating or compensating for the voltage drop occurring in the resistive cell components.

The method for the resistance free charging of a rechargeable battery comprises the steps of:

(a) charging the battery with a constant direct current voltage;

(b) interrupting the charging for a period of about at most 10 ms;

(c) sampling the electrochemical voltage of the battery during said period by a current free sampling;

(d) holding the sampled value and utilizing the same for a voltage regulating loop for said direct current voltage; and (e) repeating said steps a to d in periodic intervals substantially longer than said periods to maintain said electrochemical voltage constant.

It is preferable if the periods are about 0.5 to 3 ms.

The state of charge can be determined by measuring the charging current and/or how this current varies in time.

A resistance free constant voltage taper charger has been provided for batteries in which a voltage regulator of a conventional type is combined with a conventional instrumentation amplifier in such a way that the output voltage increases by the same amount as a reference voltage coupled to the input of the amplifier is varied. The result will be that the voltage at the final output is constant.

The same basic circuit can be complemented with a pair of switches and a sample and hold circuit controlled by a pulse generator so that in short pulse periods the voltage regulator is disabled and the resistance free electrochemical battery voltage is sampled, and during the longer intervals between the periods the sampled and stored value is used to regulate the output voltage so that the electrochemical voltage remains unchanged.

Further details and advantages of the invention will be described in connection with preferable embodiments thereof, in which reference will be made to the accompanying drawings. In the drawing.

Figure 1:
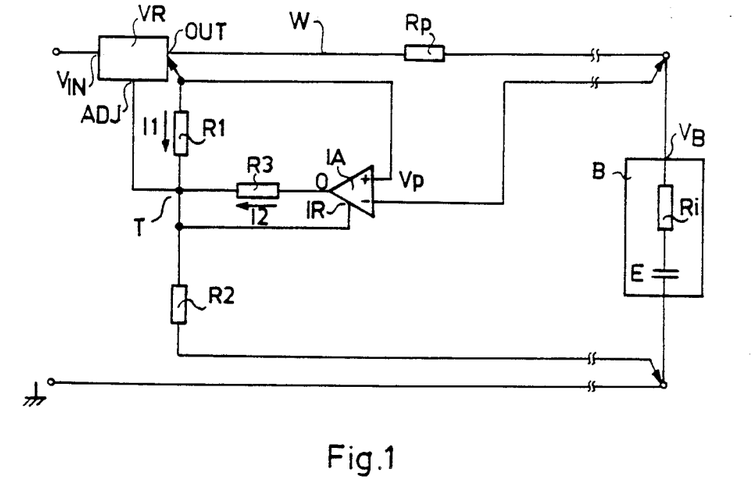
FIG. 1 is a block diagram of a first embodiment of the invention.

A preferable charger circuit shown in FIG. 1 comprises voltage regulator VR which has three main terminals such as voltage input terminal $V_{IN}$ connected to positive pole + of a DC source, adjustment terminal ADJ and output terminal OUT connected via wire W to the positive terminal of battery B which is to be charged. The negative pole − of the DC source is directly connected to the negative pole of the battery B.

Between the output OUT and the negative terminal of the battery B a series member of two resistors R1 and R2 is arranged so that their common terminal T is connected to he adjustment terminal ADJ of the voltage regulator VR. The schematic diagram of FIG. 1 shows connection wires ending with arrows (such arrows can be seen e.g. at the two ends of the series member) which indicate that the associated wire is directly coupled to the associated terminal and it has the possible shortest length and the current flowing therethrough is negligably small compared to the current of the associated terminal.

An instrumentation amplifier IA is shown in FIG. 1 which has + and − input terminals coupled to respective ends of the wire W, a reference input IR coupled to terminal T and output coupled through resistor R3 to the same terminal T. The circuit shows schematically two further resistances such as Rp and Ri. The resistance Rp represents the series resistance of the wire W that connects the battery B with the voltage regulator VR, while the resistance Ri symbolizes the internal resistance of the battery B which has a value depending on various factors such as battery type, internal design, age, state of charge, etc. The ideal cell E is symbolized as a series member in the box of the battery and it has a voltage representing the electrochemical state of charge.

The operation of the charger circuit of FIG. 1 is as follows.

The voltage regulator VR is implemented preferably by an integrated circuit such as the type LM 317 of National Semiconductor Corporation (U.S.A.) which provides a constant voltage Vref on the resistor R1 and the output voltage thereof can be expressed as:

$$Vout = Vref(1 + R2/R1) + I2 \cdot R2 \quad (1)$$

if the current flowing to the adjustment terminal ADJ is negligably small compared to I1 and I2.

The instrumentation amplifier IA can be implemented by the very high accuracy circuit type INA 101 of Burr-Brown Corporation (U.S.A.) which provides an output voltage Vo on its output terminal 0 that equals to the difference of the voltages at the two input terminals thereof designated as Vp. This is true only if the gain is adjusted to unity, which represents a preferable setting. The instrumentation amplifier IA is connected in such a way that the output voltage Vo is superimposed on the voltage connected to the reference input IR. From this fact it follows that the voltage measurable across the resistor R3 equals to the input voltage Vp, since the voltage of terminal T forms the reference for the output 0.

The current I2 can be expressed as $$I2 = Vp/R3. \quad (2)$$

If this value of I2 is substituted in the expression (1), the output voltage Vout will be:

$$Vout = Vref(1 + R2/R1) + Vp \cdot R2/R3 \quad (3)$$

If R3 = R2 condition is set, the coefficient of Vp will be 1 and the last member in the equation (3) will be Vp. In that case $$Vout = Vref(1 + R2/R1) + Vp \quad (4)$$

This equation (4) is true for any value of Vp and R2/R1. Let us now suppose that R2/R1 is set to a ratio at which the output voltage Vout corresponds to the charging voltage required at very small charging currents.

If with such settings an at least partially discharged battery B is connected to the charging circuit, a rather high charging current starts to flow through the wire W, and this current generates a voltage drop Vp on the two ends of the wire. This voltage drop Vp results in that a voltage $$V_B = Vout - Vp \quad (5)$$

can be measured across the terminals of the battery B. If the equation (5) is substituted in the equation (4), it can be seen that the member Vp is neutralized, i.e. the battery voltage:

$$V_B = Vref(1 + R2/R1) \quad (6)$$

is obtained which is independent from the voltage Vp across the serial loss resistance Rp. This voltage is simulated across the resistance R3 and the current I2 flowing through this resistor R3 increases the output voltage of the voltage regulator VR by the amount of the voltage drop Vp on the serial loss resistance Rp. With such a regulation a constant voltage is obtained across the two actually lead out terminals of the battery B.

The charging circuit of FIG. 1 can thus eliminate the unwanted limitation effects connected with the heretofore inevitable presence of the series resistance Rp, and of that ground a quasi resistance free taper charging process is obtained.

Figure 2:
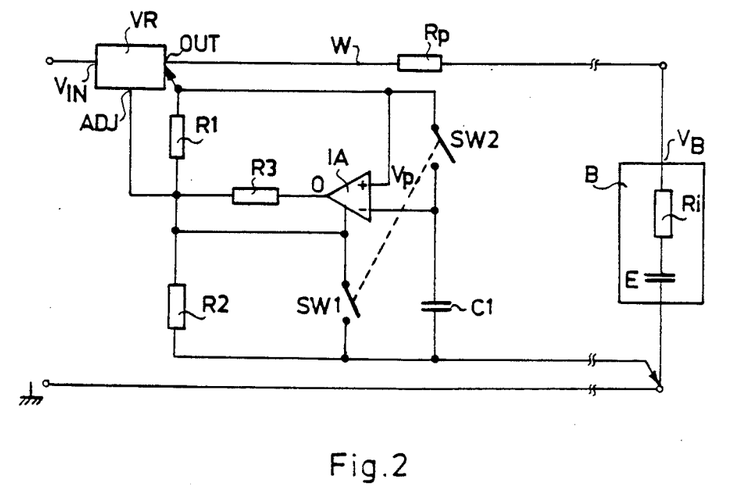
FIG. 2 is a similar block diagram of a further embodiment.

FIG. 2 shows an improved embodiment of the charging circuit of FIG. 1, in which the difference lies in the presence of a pair of switches SW1, SW2 and of a sampling capacitor C1 between the negative input of the instrumentation amplifier IA and the common (negative) terminal which latter is not connected now to the positive pole of the battery B. Switches SW1 and SW2 are always moved together.

In the dominant part of the time the switches SW1 and SW2 are closed and in this position the charging of the battery goes on substantially as explained in connection with FIG. 1. If the switches SW1 and SW2 are closed for a short period of time e.g. for 1 ms, the following events take place:

The resistor R2 gets shorted, therefore the voltage regulator VR tries to make the voltage at the output OUT equal to Vref which is about 1.2V and can be measured across the resistor R1 during all normal operation period. The voltage of the output terminal OUT cannot sink to such a low value, since the battery voltage Ve is well above this value and maintains the potential of the terminal OUT. It should be noted that the output OUT is protected against reverse flow of current, therefore no current can flow in reverse direction. The momentary battery voltage Ve is passed now through the switch SW2 to the − input of the instrumentation amplifier IA and to the sampling capacitor C1, which will be charged to this voltage Ve at once. The voltage Ve is at the same time the ideal resistance free voltage of the cell E, since no ohmic losses can be present in the path between the cell E and the sampling capacitor C1 because no current is flowing and the voltage of the cell measured immediately after the interruption of the charging process equals to the ideal electrochemical cell voltage. This is true because due to the slow kinetic processes (mass-transport phenomena) in a galvanic cell the electrochemical electrode potential cannot follow any instantaneous voltage change resulting from the current interruption. Such conditions prevail up to about 10 ms following the current interruption, whereafter a voltage starts to decay.

If the switches SW1 and SW2 are opened again within this 10 ms period, the sampling capacitor C1 will hold its voltage Ve, since the high input impedance of the instrumentation amplifier IA cannot cause any discharge. The basic operation described in connection with FIG. 1 is restored, however, the instrumentation amplifier IA is controlled now with the difference of the output voltage Vout and this resistance free voltage Ve. This difference will be present on the resistor R3 and as a consequence of the regulation, the output voltage Vout is increased by this difference relative to the preset value:

$$Vout = Vref(1 + R2/R1).$$

As a result, the charging current starts to flow and a voltage drop appears through the resistance Rp. Since the sampling capacitor C1 holds the value Ve, the afore described regulation loop functions. However, the regulation will maintain a constant voltage Ve on the imaginary terminal of the cell E rather than keeping the voltage of the positive terminal, as in the previous embodiment. If the switches SW1 and SW2 are periodically changed and the open states last less than about 10ms, an ideal resistance free tapering charge process is obtained that keeps the imaginary electrochemical cell voltage Ve constant.

A further advantage is associated with this charging method, which lies in that there will be no need for the extra connecting wire between the battery terminal and the negative input of the instrumentation amplifier IA.

Figure 3:
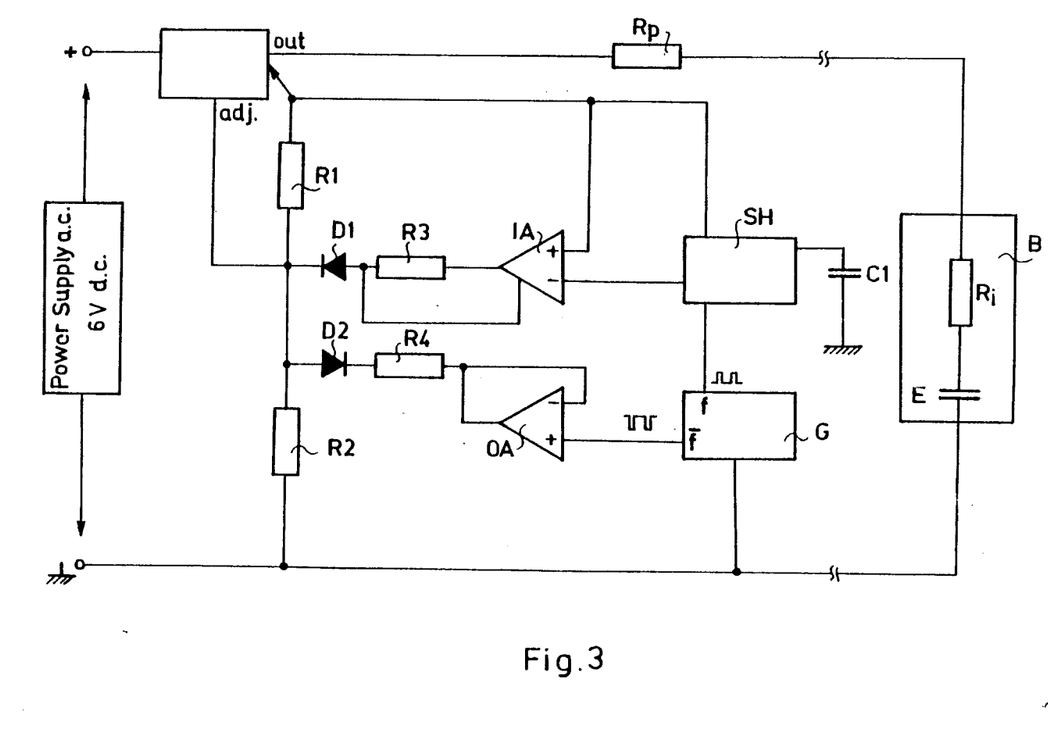
FIG. 3 shows the embodiment of FIG. 2 with more details.

FIG. 3 shows an exemplary embodiment of the resistance free charging circuit of FIG. 2. Here a pulse generator G generates short (e g. 1 ms long) pulses with a rate of about 10 Hz, which thereby controls a sample-and-hold circuit SH and an operational amplifier OA. This latter shunts the resistance R2 through diode O2 via a small resistor R4 during the existence of the pulses which interrupts the charging process. The sample-and-hold circuit SH can be implemented e.g. by the monolithic sample/hold amplifier type SHC298AM of Burr-Brown Co. (U.S.A.). The circuit SH samples the electrochemichal voltage Ve during pulse periods and the sampled value creates a basis for regulation during the long pulse intervals.

From the above way of operation it can be readily understood that the charging current is at its maximum at the starting period of the charging process when the cell can take up more current without any unwanted side effect and the charging current decreases with time as the state of charge of the cell gets increased. This kind of charging shortens the time required for attaining a fully charged state compared to conventional taper chargers.

Figure 4:
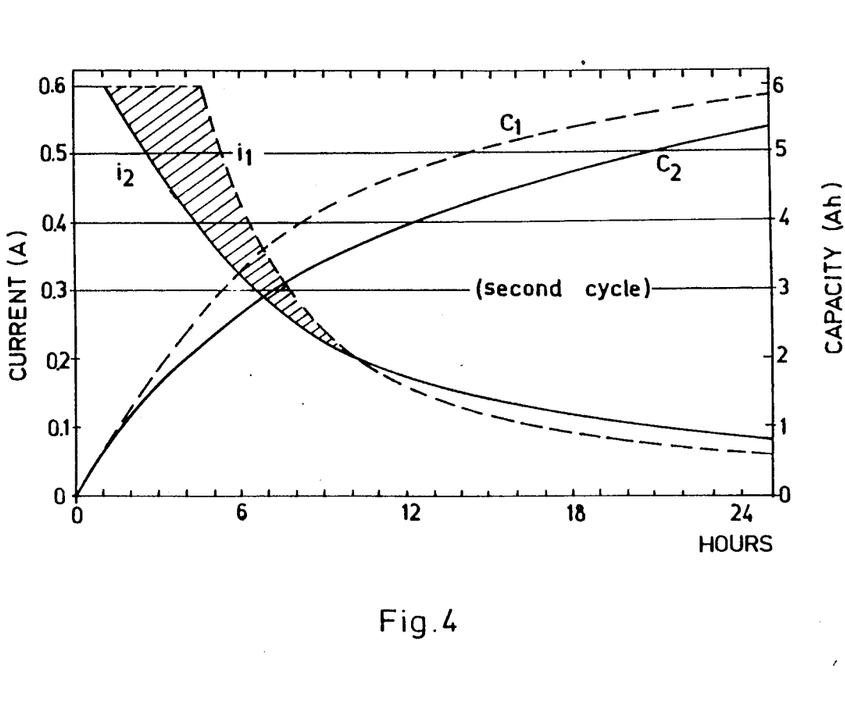
FIGS. 4. and 5. are current and capacity versus time curves of two cells.

FIG. 4 illustrates the charging speed shown in current-time diagram and also expressed in Amperehour-capacity acceptance for two 6 Ah nominal capacity rechargeable MnO2-Zn cells of which the dashed lines are associated with the cell charged by the resistance free method and the full lines relate to the other cell charged with a conventional taper charger. Both cells were new, and the diagrams relate to the second cycle thereof. The diagrams show unambiguously that the resistance free charging method is faster and it can pump in more energy than the taper charger can. The hatched diference area indicates the substantially higher charging current at the first seven hours of the charging process.

Figure 5:
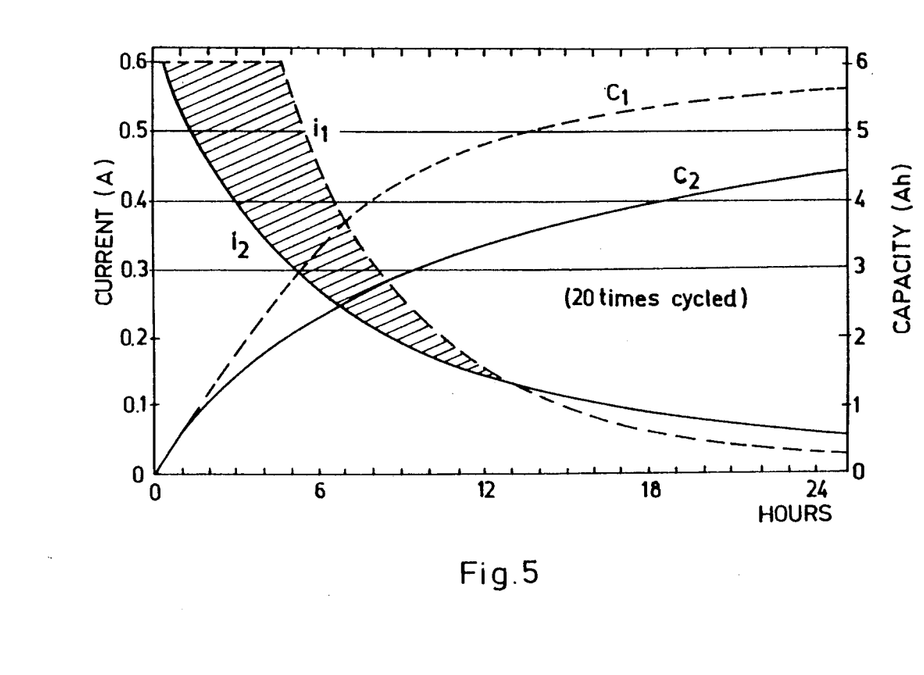

Further advantages can be seen in FIG. 5 which illustrate similar curves in the 20th cycle of the same cells. While the capacity of the cell charged with the resistance free method did not decrease at all, a substantial decrease was detectable at the other cell.

The new cell (FIG. 4) reaches its half charge (3 Ah) after 5.5 and 8 hours, respectively, while the 20 times cycled cell reach the half capacity value after 5.5 and 11 hours. The difference between the charging speeds is still higher if the attaining of the ⅔ capacity (4 Ah) charge is observed. In this case 9 and 13 hours are obtained for the new cells and 9 and 19 hours for the older ones.

Figure 6:
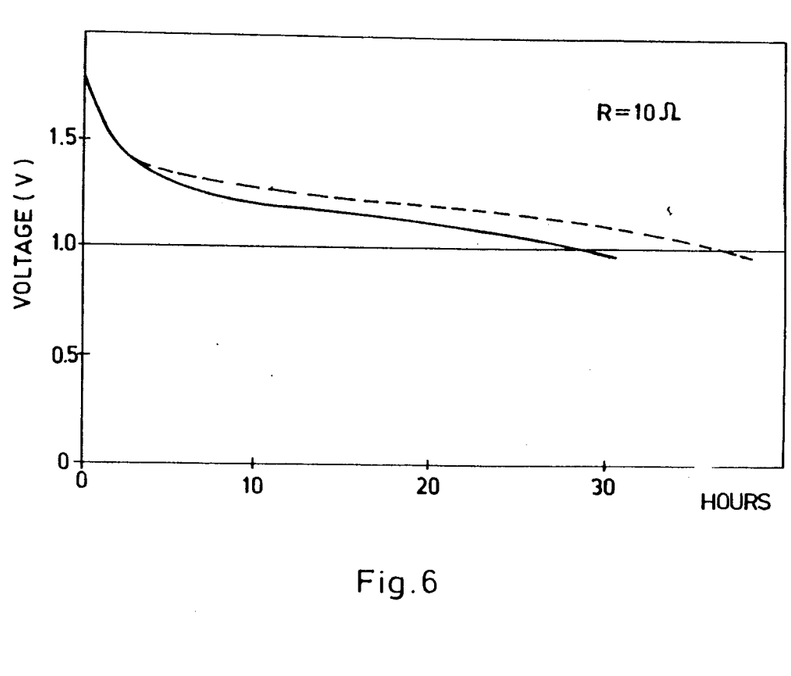
FIG. 6 is a typical discharge curve.

Typical discharge curves for the new cells can be seen in FIG. 6, in which the discharge took place through a load of 10 ohms. The larger discharge capacity of the cell charged with the resistance free method can be observed here as well.

The resistance free charging method can well be used in the case of batteries comprising a predetermined number of series cells. The series connection of the cells does not exclude the possibility of utilizing the resistance free charging principle, such charging will result in a more uniform state of charge for the individual cells. The reason of this phenomenon is that the overvoltage curves of the cells can be far better reproduced if the variations in resistance (e.g. due to bubble formation) are eliminated.

The resistance free constant voltage taper charging method can be used in the case of different types of batteries including high-power batteries e.g. jelly-roll cells, where the ratio of resistance to polarization is larger and the elimination of the Ohmic resistance has a far greater effect on the charge acceptance. A limitation with a small safety series resistance is required only if a heat limitation becomes necessary.

A further advantage of the use of the resistance free charging method lies in that the form of the charging current (as shown in FIGS. 4 and 5) is very stable during the cycling life-time of a battery of predetermined type. This means that either the momentary value or the steepness of a short section of the current curve can be sufficient for the determination of the charge state of the battery.

We claim:

1. A resistance free constant voltage taper charger for batteries, comprising: a voltage regulator means having an input terminal for receiving a first pole of a direct current supply voltage, an output terminal delivering a regulated voltage, and an adjustment terminal; a first resistor between said output and adjustment terminals, said voltage regulator means being of the type capable of maintaining a constant voltage across said first resistor; a second resistor coupled between said adjustment terminal and the second pole of the supply voltage; a third resistor connected to said adjustment terminal; an instrumentation amplifier having an output coupled through said third resistor to said adjustment terminal, a reference input coupled to said adjustment terminal, and a pair of input terminals, said instrumentation amplifier being of the type capable of providing a direct current voltage signal at said output corresponding to the difference of the voltages coupled to said input terminals superimposed onto a voltage level defined by the voltage at said reference input; said output terminal of the voltage regulator means being coupled to a first side of the battery to be charged; the second pole of said direct current supply voltage being coupled to the second side of said battery to be charged; and said input terminals of said instrumentation amplifier being coupled to said output terminal and to said first side of said battery to be charged, so that said voltage output signal of said instrumentation amplifier corresponds to the resistance free voltage of said battery to be charged.

2. The resistance free constant voltage taper charger as claimed in claim 1, wherein said instrumentation amplifier has a unity gain, and said second and third resistors are equal.

3. The resistance free constant voltage taper charger as claimed in claim 1, wherein said input terminals of said instrumentation amplifier are directly coupled to said regulated output terminal and to the terminal of the battery which is connected with said output terminal.

4. The resistance free constant voltage taper charger as claimed in claim 1, wherein said instrumentation amplifier has a unity gain, and said second and third resistors are equal.

5. The resistance free constant voltage taper charger as claimed in claim 1, wherein said first switch is an operational amplifier, said second switch is a sample and hold circuit, and said switches are controlled by a pulse generator.

6. The resistance free constant voltage taper charger as claimed in claim 5, wherein said sample and hold circuit contains a capacitor as the hold means thereof.

7. The resistance free constant voltage taper charger as claimed in claim 1, wherein said sample and hold means is a capacitor.

8. A resistance free constant voltage taper charger for batteries, comprising: a voltage regulator means having an input terminal for receiving a first pole of a direct current supply voltage, an output terminal delivering a regulated voltage, and an adjustment terminal; a first resistor between said output and adjustment terminals, said voltage regulator means being of the type capable of maintaining a constant voltage across said first resistor; a second resistor coupled between said adjustment terminal and the second pole of the supply voltage; a third resistor connected to said adjustment terminal; an instrumentation amplifier having an output coupled through said third resistor to said adjustment terminal, a reference input coupled to said adjustment terminal, and a pair of input terminals, said instrumentation amplifier being of the type capable of providing a direct current voltage signal at said output corresponding to the difference of the voltages coupled to said input terminals superimposed onto a voltage level defined by the voltage at said reference input; said output terminal of the voltage regulator means being coupled to a first side of the battery to be charged; the second pole of said direct current supply voltage being coupled to the second side of said battery to be charged;

said resistance free constant voltage taper charger further comprising a first switch for shorting said second resistor, a second switch for shorting said input terminals, and means for simultaneously closing said switches to said shorting conditions; a first of said input terminals of said instrumentation amplifier being connected to said regulated output terminal of said voltage regulator, and a sample and hold means being coupled between the second of said input terminals of said instrumentation amplifier and the second pole of the supply voltage; said switches being shorted for repetitive periods shorter than 10 ms for simultaneously disabling said voltage regulator means and for sampling the instantaneous battery voltage in said sample and hold means; the repetition periods for shorting said switches being substantially longer than 10 ms.

* * * * *

UNITED STATES PATENT AND TRADEMARK OFFICE
CERTIFICATE OF CORRECTION

PATENT NO. : 4,977,364

DATED : December 11, 1990

INVENTOR(S) : Karl Kordesch, et al

It is certified that error appears in the above-identified patent and that said Letters Patent is hereby corrected as shown below:

ON TITLE PAGE:   Item [75]

Second inventor should read, "Ronald UJJ"

Signed and Sealed this

Seventh Day of July, 1992

*Attest:*

DOUGLAS B. COMER

*Attesting Officer*   Acting Commissioner of Patents and Trademarks

UNITED STATES PATENT AND TRADEMARK OFFICE
CERTIFICATE OF CORRECTION

PATENT NO. : 4,977,364

DATED : December 11, 1990

INVENTOR(S) : Karl Kordesch & Roland Ujj

It is certified that error appears in the above-identified patent and that said Letters Patent is hereby corrected as shown below:

On the title page, item [75] Inventors: please change the second inventors name to read as --Roland Ujj--.

This certificate supersedes Certificate of Correction issued July 7, 1992.

Signed and Sealed this

Eighth Day of December, 1992

Attest:

DOUGLAS B. COMER

*Attesting Officer*    *Acting Commissioner of Patents and Trademarks*